L. LEE.
REEL.
APPLICATION FILED JAN. 9, 1919.
1,303,335. Patented May 13, 1919.
2 SHEETS—SHEET 1.
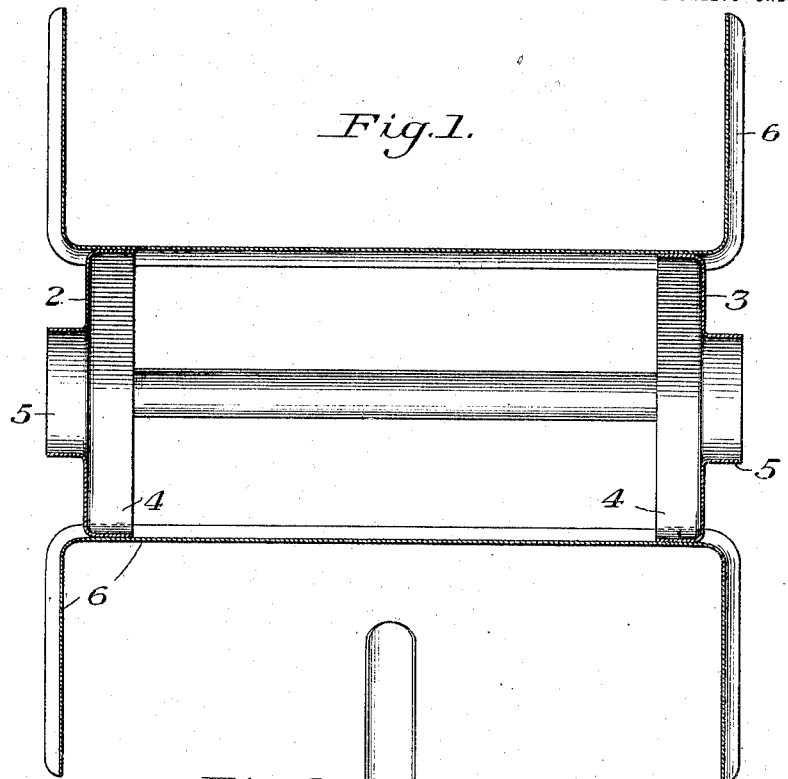
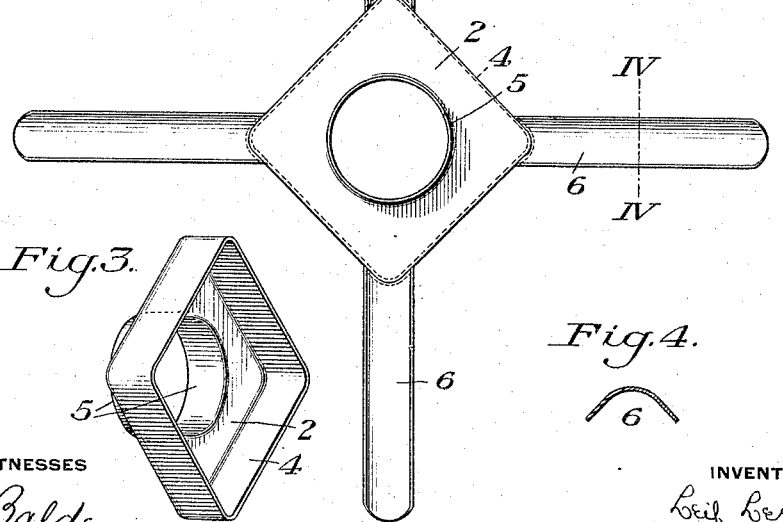
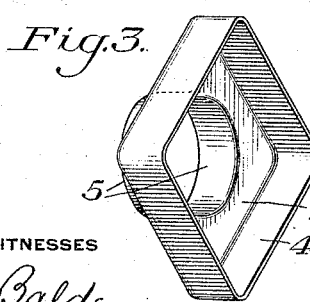
WITNESSES
INVENTOR

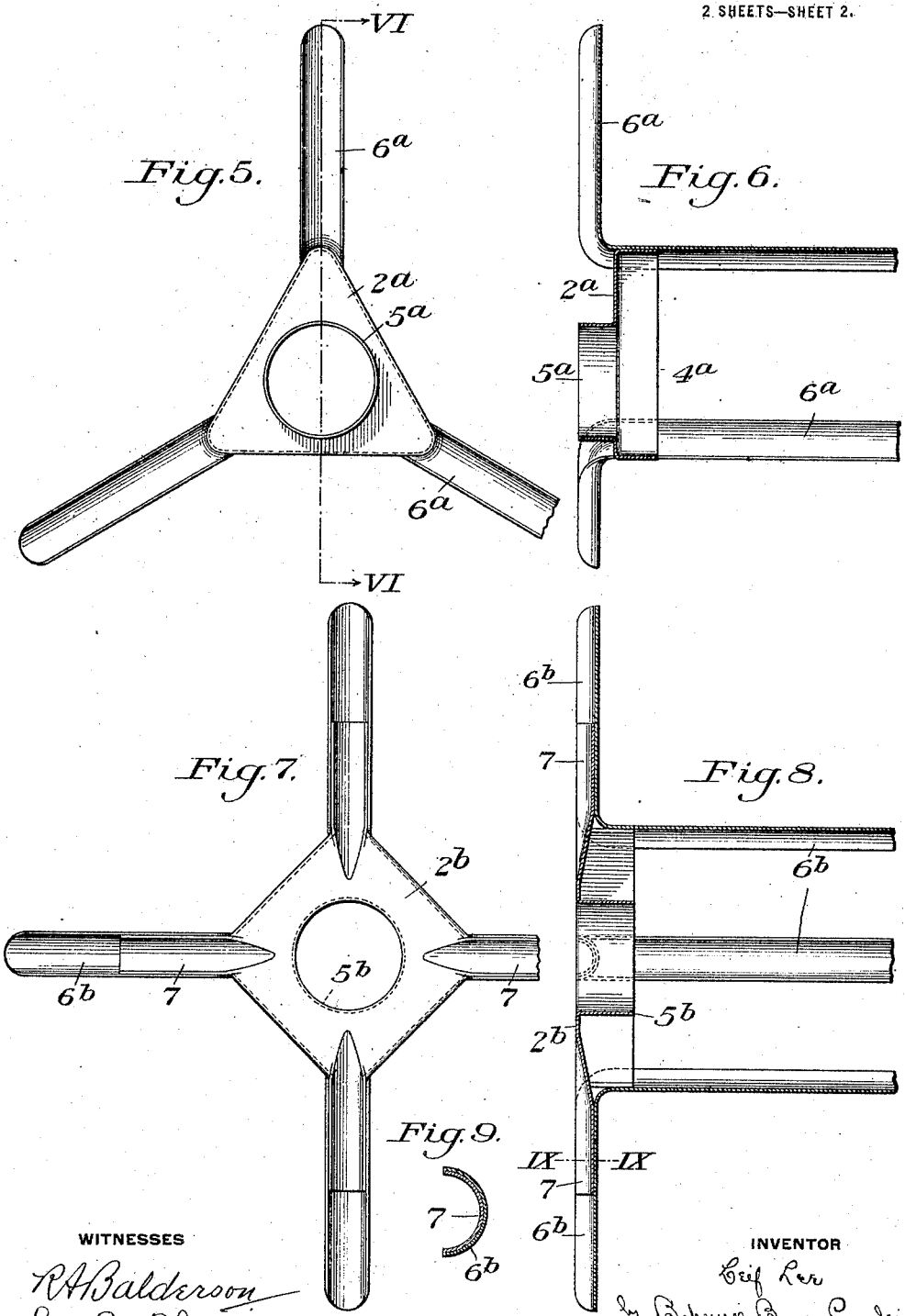

UNITED STATES PATENT OFFICE.

LEIF LEE, OF YOUNGSTOWN, OHIO.

REEL.

1,303,335.    Specification of Letters Patent.    Patented May 13, 1919.

Application filed January 9, 1919. Serial No. 270,344.

*To all whom it may concern:*

Be it known that I, LEIF LEE, a citizen of the United States, residing at Youngstown, in the county of Mahoning and State of Ohio, have invented a new and useful Improvement in Reels, of which the following is a full, clear, and exact description, reference being had to the accompanying drawings, forming part of this specification, in which—

Figure 1 is a longitudinal section of one form of reel embodying my invention.

Fig. 2 is an end view of the same.

Fig. 3 is a perspective view of one of the reel heads.

Fig. 4 is a section on the line IV—IV of Fig. 2.

Fig. 5 is an end view, and Fig. 6 is a partial longitudinal section showing a modification.

Fig. 7 is an end view and Fig. 8 is a partial section of still another modification, and Fig. 9 is a section on the line IX—IX of Fig. 8.

My invention has relation to reels, and more particularly to reels such as are used for coiling and holding wire and similar products.

The object of my invention is to provide an all-metal reel which can be manufactured rapidly and easily at a relatively low cost, and which will be strong and durable in service.

The nature of my invention will be best understood by reference to the accompanying drawings in which I have shown several embodiments and which will now be described, it being premised that the invention is susceptible to other modifications within the spirit and scope of the appended claims.

Referring first to that form of my invention shown in Figs. 1 to 4, inclusive, the numerals 2 and 3 designate two reel heads which are preferably formed by stamping them from sheet metal. Each of the heads is formed with an inwardly turned flange 4, and with a central outwardly extending hollow boss or hub 5. The two heads are connected by a plurality of U-shaped members 6, four of such members, equally spaced, being shown in these figures. The general form of the heads is rectangular and the U-members 6 are secured to the corners or angles of the heads. This is done in any suitable manner, such as riveting or spot welding, the latter method being illustrated. The U-members 6 may be of any suitable cross-section. In the form shown in these figures, these members are of trough-like section, the concave sides being welded to the inwardly turned flanges 4 of the heads.

These U-members constitute the reel arms, and also the only connection between the heads.

The construction illustrated in Figs. 5 and 6 is substantially the same as that previously described, except that the heads are of triangular form and only three of the U-members $6^a$ are employed, thus forming a three-armed reel.

In the form of my invention shown in Figs. 7, 8 and 9, the heads are of rectangular form, but are made somewhat differently from those previously described, in that the hubs or bosses $5^b$ are struck inwardly, instead of outwardly, and the outer faces of the heads are crowned so that the separate portions are substantially in the vertical planes of the outer edges of the U-members $6^b$. In this form I have also shown the heads provided at the angles with integral reinforcing projections 7 of concave form and which fit within and are welded to the concave faces of the arms of the members $6^b$. In this manner, long welds are provided for the connections and the structure is very considerably strengthened by the reinforcements.

The advantages of my invention will be apparent. The parts can be very cheaply and rapidly formed and assembled, and the finished reels of strong and durable character.

It will be obvious that the shape and construction of the heads may be changed; that the U-members may be of various forms in cross-section; that any desired number of them may be used; and that the exact method of connecting the parts may also be changed, all within the spirit and scope of the claims.

I claim:

1. A metal reel comprising two spaced opposing flanged heads, and a plurality of U-members secured to the flanges of and connecting the heads, said members forming the only connections between the heads and also forming the carriers of the reel, substantially as described.

2. An all-metal reel, comprising two spaced opposing flanged angular heads formed from sheet metal, and a plurality of U-shaped reel arms or carriers secured one to each corner or angle of the heads, substantially as described.

3. An all-metal reel, comprising two spaced opposing flanged angular heads formed from sheet metal, and a plurality of U-shaped reel arms or carriers secured one to each corner or angle of the heads, said U-members forming the only connection between the heads, substantially as described.

4. An all-metal reel, comprising two opposing spaced heads having inturned flanges, and a plurality of U-members secured to the flanges of said heads, said U-members forming the only connection between the heads, substantially as described.

5. An all-metal reel, comprising two opposed spaced heads having inturned flanges, and a plurality of U-members of trough-shape in cross-section, secured to said flanges at the corners of the heads, said U-members forming the only connection between the heads, substantially as described.

6. An all-metal reel, comprising two opposing spaced heads having inturned flanges, and a plurality of U-members of trough-shape in cross-section, welded to said flanges at the corners of the heads, said U-members forming the only connection between the heads, substantially as described.

7. An all-metal reel comprising two opposed spaced flanged heads, and a plurality of U-members secured to and forming the only connection between said heads, the latter having radial reinforcing projections secured to the vertical arms of said U-members, substantially as described.

8. An all-metal reel comprising two opposed spaced flanged heads, and a plurality of U-members secured to and forming the only connection between said heads, the latter having radial reinforcing projections secured to the vertical arms of said U-members, said arms and the reinforcement being of interfitting trough form in cross-section, substantially as described.

9. An all-metal reel, comprising two opposed spaced flanged heads, and a plurality of U-members secured to and forming the only connection between said heads, said heads having integral bearing or trunnion projections, substantially as described.

In testimony whereof, I have hereunto set my hand.

LEIF LEE.

Copies of this patent may be obtained for five cents each, by addressing the "Commissioner of Patents, Washington, D. C."